United States Patent [19]

Bunch

[11] Patent Number: 5,345,126
[45] Date of Patent: Sep. 6, 1994

[54] POSITIVE TEMPERATURE COEFFICIENT START WINDING PROTECTION

[75] Inventor: Ricky L. Bunch, Tecumseh, Mich.

[73] Assignee: Tecumseh Products Company, Tecumseh, Mich.

[21] Appl. No.: 146,435

[22] Filed: Oct. 29, 1993

Related U.S. Application Data

[63] Continuation of Ser. No. 856,507, Mar. 24, 1992, abandoned.

[51] Int. Cl.⁵ .................. H02K 11/00; H02H 7/08
[52] U.S. Cl. .................. 310/68 C; 361/24; 318/783
[58] Field of Search ........... 310/68 R, 68 C; 361/24, 361/25, 27, 31, 106; 318/783, 788, 791, 792

[56] References Cited

U.S. PATENT DOCUMENTS

| | | | |
|---|---|---|---|
| 3,955,170 | 5/1976 | Geishecker | 318/471 |
| 3,963,962 | 6/1976 | Sutton | 318/473 |
| 4,084,202 | 4/1978 | Stoll | 361/24 |
| 4,086,558 | 4/1978 | Pejouhy | 318/171 |
| 4,092,573 | 5/1978 | D'Entremont | 318/783 |
| 4,100,468 | 7/1978 | Slocum | 318/783 |
| 4,119,894 | 10/1978 | Sorensen | 318/783 |
| 4,161,681 | 7/1979 | Rathje | 318/783 |
| 4,181,393 | 1/1980 | Lill | 310/68 C |
| 4,198,669 | 4/1980 | Kulwicki | 361/24 |
| 4,250,419 | 2/1981 | Zolman | 310/68 C |
| 4,319,299 | 3/1982 | Woods et al. | 361/24 |
| 4,387,330 | 6/1983 | Zigler | 318/788 |
| 4,408,244 | 10/1983 | Weible | 361/24 |
| 4,422,120 | 12/1983 | Kobayashi | 361/24 |
| 4,467,385 | 8/1984 | Bandoli et al. | 361/24 |
| 4,701,824 | 10/1987 | Beggs et al. | 361/24 |
| 4,890,025 | 12/1989 | Hadeler et al. | 310/68 C |
| 5,010,264 | 4/1991 | Yamada et al. | 310/68 C |
| 5,021,915 | 6/1991 | Wandler et al. | 361/26 |
| 5,032,749 | 7/1991 | Stone | 310/68 C |
| 5,053,908 | 10/1991 | Cooper et al. | 361/24 |
| 5,055,726 | 10/1991 | D'Entremont et al. | 310/71 |

Primary Examiner—Steven L. Stephan
Assistant Examiner—Clayton E. LaBalk
Attorney, Agent, or Firm—Baker & Daniels

[57] ABSTRACT

A protection circuit for a permanent split capacitor motor includes a positive temperature coefficient (PTC) resistor in series with the auxiliary winding of the motor for protecting the auxiliary winding during normal operation. At a predetermined temperature anomaly due to over-current conditions in the windings, the PTC resistor will sharply increase its resistance to a point wherein no current will pass, effectively open circuiting the auxiliary winding from the power source, thereby protecting the windings from damage. A thermally responsive protector may also be used in conjunction with the PTC resistor for providing further over-current protection to both the main and auxiliary windings.

9 Claims, 1 Drawing Sheet

POSITIVE TEMPERATURE COEFFICIENT START WINDING PROTECTION

This is a continuation of application Ser. No. 07/856,507, filed Mar. 24, 1992 now abandoned.

BACKGROUND OF THE INVENTION

1. Field of the Invention

The present invention relates to the protection of motor windings and, more particularly to the protection of start windings of permanent split capacitor motors due to over-current conditions.

2. Description of the Prior Art

In the past, various types of combination starter-protector devices have been utilized in circuit relation with a winding circuit of a motor. At least some of these past combination starter/protector devices utilized a positive temperature coefficient (PTC) element which was operable generally to at least impede current flow to a start or auxiliary winding of the motor circuit generally as the motor was energized to its preselected running or synchronous speed, and an overload or protector was thermally coupled with the PTC element and subjected to the current in at least a run or main winding of the motor. Of course, the overload was operable to interrupt the current flow to the motor in the event of the occurrence of a winding circuit overload condition which may have a deleterious effect on components of the motor, such as for instance, burning out of the winding circuit.

In existing single phase induction motors, such as capacitor start induction motors and split phase type motors, a PTC element has come to be used as a switching element for energizing the start winding of the motor and disassociating the start or auxiliary winding from the run or main winding of the motor when the motor attains its running speed. Upon initial energization of the motor, the PTC element is at a low temperature, and sufficient current passes through the PTC element to energize the start winding to thereby assist in the energization of the motor. A PTC element is self-heating upon energization wherein the resistance of the PTC element increases generally as a function of its increasing temperature. Therefore, at elevated temperatures of the PTC element caused by the passing current, the PTC element acted to limit passage of current applied therethrough to the start winding to an acceptable minimum value which, in effect, electrically disassociated the start winding from circuit relation with the run or main windings of the motor generally upon the motor attaining its preselected running speed.

One of the disadvantages or undesirable features of employing a PTC element as a starting resistor is the time required, after the motor was de-energized or turned off, for the PTC element to cool sufficiently in order to restart the motor. In some instances, at least one or two minutes may have been necessary to cool the PTC element to a temperature value at which it may pass sufficient current to effect motor restarting.

Permanent split capacitor motors (PSC's) with or without a start capacitor, which are used in most single phase room and unitary compressors, do not switch out the winding during normal operation. Such motors offer a desired compromise between starting torque, running efficiency, and cost requirements for these horsepower sizes. The use of PTC elements were not desirable in PSC's because switching out of the auxiliary winding was not desired. Thus, protector devices for PSC's to cut out the auxiliary winding and/or the main winding from the circuit remained thermally responsive contactors in thermal relation with a resistance heating wire.

The disadvantages of a thermal contactor thermal wire protector is its inherent inability to quickly disassociate the windings from the circuit, and its long period of time before reset. The windings could be damaged to a point that operation would not or should not occur.

SUMMARY OF THE INVENTION

The present invention provides in a permanent split capacitor (PSC) motor with or without a start capacitor, a current overload protector for the auxiliary winding. A positive temperature coefficient (PTC) resistor allows normal operating current to flow through the auxiliary winding during motor operation. At a predetermined temperature due to over-current conditions, the PTC resistor prevents current from flowing through the auxiliary winding.

The PTC element in series with the auxiliary winding increases its resistance in response to a rise in temperature caused by an increase in current so as to effectively block the current from flowing through the auxiliary winding when an over-current condition is encountered. During normal operation the PTC element allows current to flow through the auxiliary winding, but open circuits upon reaching the anomaly temperature, thus cutting the auxiliary winding out of the circuit.

An over-current protection device for a permanent split capacitor (PSC) motor is shown having an auxiliary winding and a main winding, the auxiliary winding and the main winding connected in parallel, and a run capacitor connected in series with the auxiliary winding. The protection device comprises: a positive temperature coefficient (PTC) element connected in series with the auxiliary winding; whereby the PTC element is selected such that its anomaly temperature allows start-up current and normal operation current to flow through the auxiliary winding, but which interrupts the current flow in the auxiliary winding when an over-current or fault current condition occurs by an increase in resistance due to a concurrent rise in temperature.

In one form thereof, the PTC over-current protector is integral with a thermal protector provided internal to the motor windings. In another form thereof, the PTC protector is provided internal to the motor windings but separate from the thermal protector. In yet another form thereof, the PTC protector is external to the motor windings and separate from the thermal protector.

It is an advantage of the present invention that the auxiliary winding is open circuited as long as the fault condition is present.

It is another advantage of the present invention that the PTC protector has automatic reset ability after cool down.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
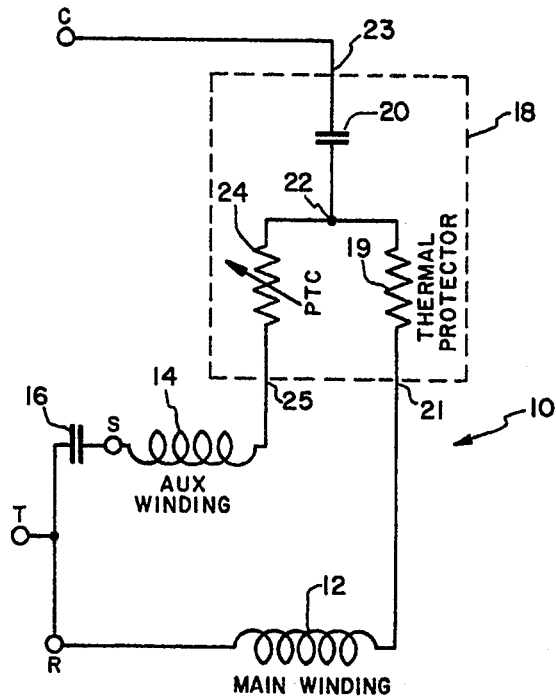
FIG. 1 is a partial schematic of a permanent capacitor split phase motor showing the main and auxiliary windings incorporating an internal PTC device integral with a thermal protector element.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

It is not necessary for the understanding of the present invention to explain in detail the theory of operation of permanent split capacitor (PSC) motors with or without a starting capacitor, other than the auxiliary or start winding is not open circuited or removed from the circuit after the motor has reached a predetermined running speed, but remains in the circuit during operation.

Referring to FIG. 1 there is shown a partial schematic of a permanent split capacitor (PSC) motor 10 showing a main winding 12 along with an auxiliary or start winding 14. It should be understood that the partial schematics of the various Figures illustrate the run capacitor and main and auxiliary windings in relationship to the thermal protector and PTC element described hereinbelow. Other motor circuit elements may be desirable depending on the particular motor application but are not hereinshown, e.g. a start capacitor for starting torque thus defining the PSC to be a capacitor start capacitor run motor. Auxiliary winding 14 includes a terminal S on one end which is connected in series to a run capacitor 16. Main winding 12 includes a terminal R on one end which is connected to the other end of the run capacitor 16, which is also connected to terminal T. Terminal T is connected to one end of a single-phase power supply (not shown) for providing power to the motor windings. Incoming current from terminal T thus splits between auxiliary winding 14 and main winding 12. Capacitor 16 is connected in series with auxiliary winding 14 so that the split portion of the current flowing through capacitor 16 is slightly delayed in phase by capacitor 16, and thus the current flowing through auxiliary winding 14 is phase-shifted relative to the phase of the current flowing through main winding 12.

In accordance with one embodiment of the present invention as shown in FIG. 1, a winding protector unit 18 includes an integral thermal protector consisting of a resistance heating wire 19 and a bimetal contactor 20 or the like thermally responsive to resistance heating wire 19. One end of resistance wire 19 defines a terminal 21 of winding protector unit 18 which is connected to main winding 12 opposite terminal R, while the other end of resistance wire 19 is connected to one end of contactor 20 at node 22. The other end of contactor 20 not connected at node 22 defines a terminal 23 of winding protector unit 18 that is connected to terminal C in communication with the electrical power source. Contactor 20 is a thermally responsive device and is positioned such that is in a thermal relationship with resistance wire 19. As resistance wire 19 heats due to an over-current condition passing through main winding 12, contactor 20 opens at a predetermined temperature. The opening of contactor 20 thus open circuits both main winding 12 and auxiliary winding 14 from the power source by stopping the flow of current between terminals T and C. Contactor 20 resets itself after a predetermined time period depending on the type of material used for the contactor and the corresponding time period for a sufficient decrease in temperature of resistance wire 19.

Integral with resistance wire 19 and contactor 20 in protector unit 18 is a positive temperature coefficient (PTC) resistor 24. PTC describes the fundamental characteristic of a certain type of conductive, but resistive, material. PTC resistor 24 remains at a low, relatively constant level of resistance over a relatively wide range, but will abruptly increase its resistance at some predetermined elevated temperature known as the anomaly temperature. PTC resistor 24 is connected at one end to node 22 and, at the other end defines terminal 25 of protector unit 18 which is connected to one end of auxiliary winding 14. Thus, PTC resistor 24 is in series with auxiliary winding 14, and is integral with thermal protector 19, 20 and disposed internal to the motor.

Figure 2:
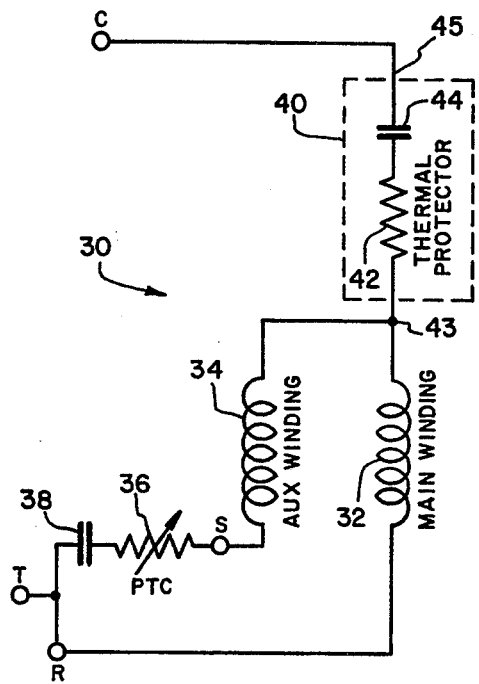
FIG. 2 is a partial schematic of a permanent capacitor split phase motor showing the main and auxiliary windings incorporating an internal PTC device separate from the thermal protector element, protecting the auxiliary winding.

Referring now to FIG. 2, there is shown a partial schematic of a permanent split capacitor (PSC) motor 30 showing a main winding 32 along with an auxiliary or start winding 34 having a terminal S on one end.

According to another embodiment of the present invention, auxiliary winding 34 is connected in series at terminal S to a PTC resistor 36. PTC resistor is in series with a run capacitor 38 which is connected to a terminal T. Terminal T is connected with terminal R of main winding 32. Main winding 32 and auxiliary winding 34 are connected at node 43 so as to be connected in parallel. A thermal protector unit 40 is connected at node 43 and consists of a resistance heating wire 42 and a thermally responsive contactor 44. Contactor 44 defines a terminal 45 of thermal protector unit 40 at one end which is connected to a terminal C. Terminal C is connected to one end of an electrical power supply. Contactor 44 is positioned such that it is in a thermal relationship with resistance wire 42. As resistance wire 42 heats due to an over-current condition passing through main winding 32 or auxiliary winding 34, contactor 44 opens at a predetermined temperature. The opening of contactor 44 thus open circuits both main winding 32 and auxiliary winding 34 from the power source by stopping the flow of current between terminals T and C. Contactor 44 resets itself after a predetermined time period depending on the type of material used for the contactor and the corresponding time period for a sufficient decrease in temperature of resistance wire 42. PTC resistor 36 provides a separate protection device and is external to the motor windings and the internal thermal protective unit 40.

Figure 3:
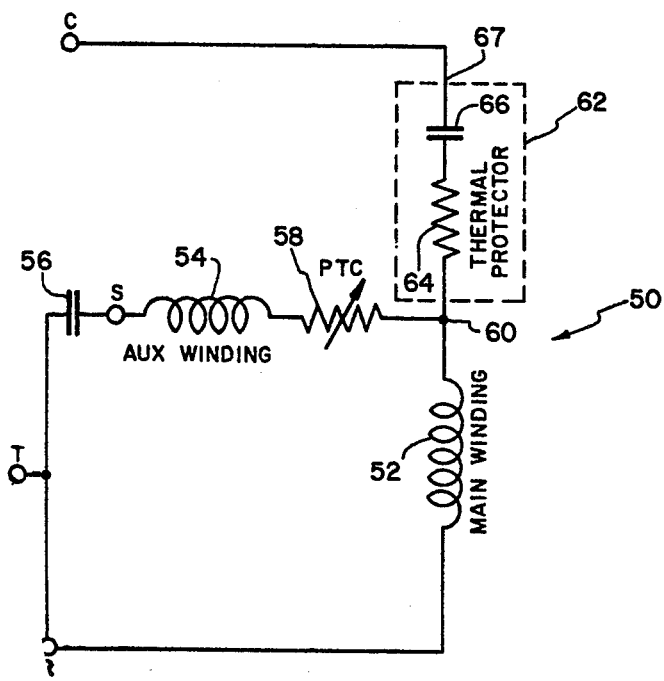
FIG. 3 is a partial schematic of a permanent capacitor split phase motor showing the main and auxiliary windings incorporating an external PTC device separate from the thermal protector element, protecting the auxiliary winding.

Referring to FIG. 3, there is shown a partial schematic of a PSC motor 50 showing a main winding 52 along with an auxiliary or start winding 54. Auxiliary winding 54 includes a terminal S on one end to which is connected in series a run capacitor 56. Run capacitor 56 is connected to terminal T which is connected to one end of an electrical power supply, and to terminal R of main winding 52.

According to a further embodiment of the present invention, a PTC resistor 58 is connected at one end with auxiliary winding 54 so as to be in series therewith, and is connected at the other end to node 60 to which is also connected the other end of main winding 52. Thus, auxiliary winding 54, run capacitor 56, and PTC resistor 58 are connected in parallel with main winding 52. A thermal protector unit 62 is connected at node 60 and includes a resistance heating wire 64 and a thermally responsive contactor 66. Contactor 66 defines on one end a terminal 67 of thermal protector unit 62 which is connected to terminal C. Terminal C is connected to one end of an electrical power supply. Contactor 66 is positioned such that it is in a thermal relationship with resistance wire 64. As resistance wire 64 heats due to an over-current condition passing through main winding 52 or auxiliary winding 54, contactor 66 opens at a predetermined temperature. The opening of contactor 66 thus open circuits both main winding 52 and auxiliary winding 54 from the power source by stopping the flow of current between terminals T and C. Contactor 66 resets itself after a predetermined time period depending on the type of material used for the contactor and the corresponding time period for a sufficient decrease in temperature of resistance wire 64. PTC resistor 58 is internal to the motor, but is not integral with the thermal protector unit 62, being separate therefrom.

The operation of the present invention, described hereinbelow, is applicable to the embodiments of FIGS. 1-3. It should be noted that when an element is numbered differently in FIGS. 1-3, the numbers hereinbelow listed next to that element are the numbers assigned in FIGS. 1-3 respectively. Single phase alternating current electric power is connected between terminals T and C. Current entering terminal T splits, one flow branching into terminal R and thus main winding 12, 32, or 52, while the other flow branches into run capacitor 16, 38, or 56. Run capacitor 16, 38, or 56, shifts (delays) the phase of electrical current flowing through auxiliary winding 14, 34, or 54 relative to the phase of current flowing through main winding 12, 32, or 52. In a permanent split capacitor motor, the auxiliary winding is not cut out of the circuit after start-up but remains in the circuit to increase the efficiency and smoothness of operation of the single-phase motor. Although the PTC resistor 24, 36, or 58, is disposed in different positions relative to the auxiliary winding 14, 34, or 54, the PTC resistor is always connected in series with the auxiliary winding. In series with an electrical load (the auxiliary winding) the PTC resistor will remain at a low temperature and resistance as long as the load operates under normal operating conditions. If an overload condition occurs, the increased current will cause the PTC resistor to rise to a high resistance mode, thereby functioning like a fuse to interrupt the fault current from flowing through the auxiliary winding during a predetermined time period. Thus, the auxiliary winding is effectively cut out of the circuit. Once the over-current or fault condition has been removed or subsides, the PTC resistor will lower to a less resistive mode and the current will again flow. The PTC resistor is herein utilized as a winding protector by selecting its anomaly temperature such that normal and start-up current do not approach the anomaly point, but an over-current or fault condition will. Thus, the PTC protects the auxiliary winding from damage by interrupting the flow of current therethrough until the PTC resistor resets itself.

Concurrently, resistance heating wire 19, 42, or 64 of thermal protector 18, 40, or 62 heats due to the over-current condition which causes contactor 20, 44, or 56 to open upon reaching a predetermined temperature, thus open circuiting the main winding and the auxiliary winding from the power supply.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An over-current protection device for a permanent split capacitor (PSC) motor having an auxiliary winding and a main winding, the auxiliary winding and the main winding connected in parallel, and a run capacitor connected in series with the auxiliary winding, the protection device comprising:
a positive temperature coefficient (PTC) element connected in series with the auxiliary winding and in parallel with the main winding, said PTC element having an anomaly temperature that allows start-up current and normal operation current to flow through the auxiliary winding, but which substantially interrupts the current flow in the auxiliary winding when an over-current or fault current condition occurs by an increase in resistance due to a concurrent rise in temperature to effectively open-circuit the auxiliary winding from the current flow.

2. The protection device of claim 1, wherein said PTC element is disposed internal to said windings.

3. The protection device of claim 1, wherein said PTC element is disposed external to said windings.

4. The protection device of claim 1, further comprising a thermal protector for interrupting power to the motor, said thermal protector disposed in series with the main and auxiliary windings.

5. The protection device of claim 4, wherein said PTC element is integral with said thermal protector.

6. An over-current protection device for a permanent split capacitor (PSC) motor having an auxiliary winding and a main winding, the auxiliary winding and the main winding connected in parallel, and a run capacitor connected in series with the auxiliary winding, the protection device comprising:
a positive temperature coefficient (PTC) element connected in series with the auxiliary winding and in parallel with the main winding; and
a thermal protector for interrupting power to the motor, said thermal protector disposed in series with the main and auxiliary windings;
said PTC element having an anomaly temperature that allows start-up current and normal operation current to flow through the auxiliary winding, but which substantially interrupts the current flow in the auxiliary winding when an over-current or fault current condition occurs by an increase in resistance due to a concurrent rise in temperature to effectively open-circuit the auxiliary winding from the current flow.

7. The protective device of claim 6, wherein said PTC element is disposed internal to said windings.

8. The protective device of claim 6, wherein said PTC element is disposed external to said windings.

9. The protection device of claim 8, wherein said PTC element is integral with said thermally responsive means.

* * * * *